Figure 9:
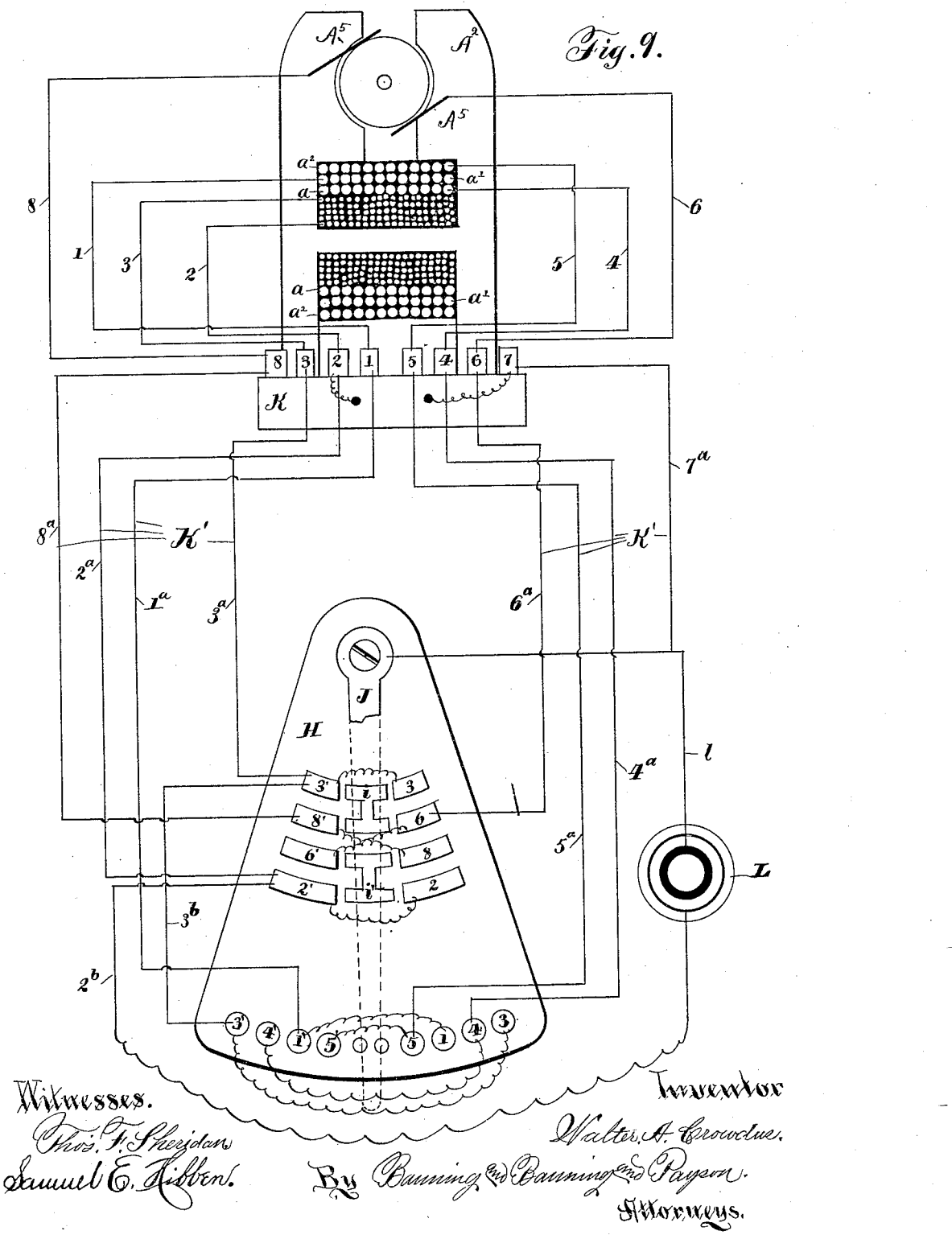

(No Model.) 2 Sheets—Sheet 1.
W. A. CROWDUS.
ELECTRIC MOTOR FOR DENTAL ENGINES.
No. 521,138. Patented June 5, 1894.
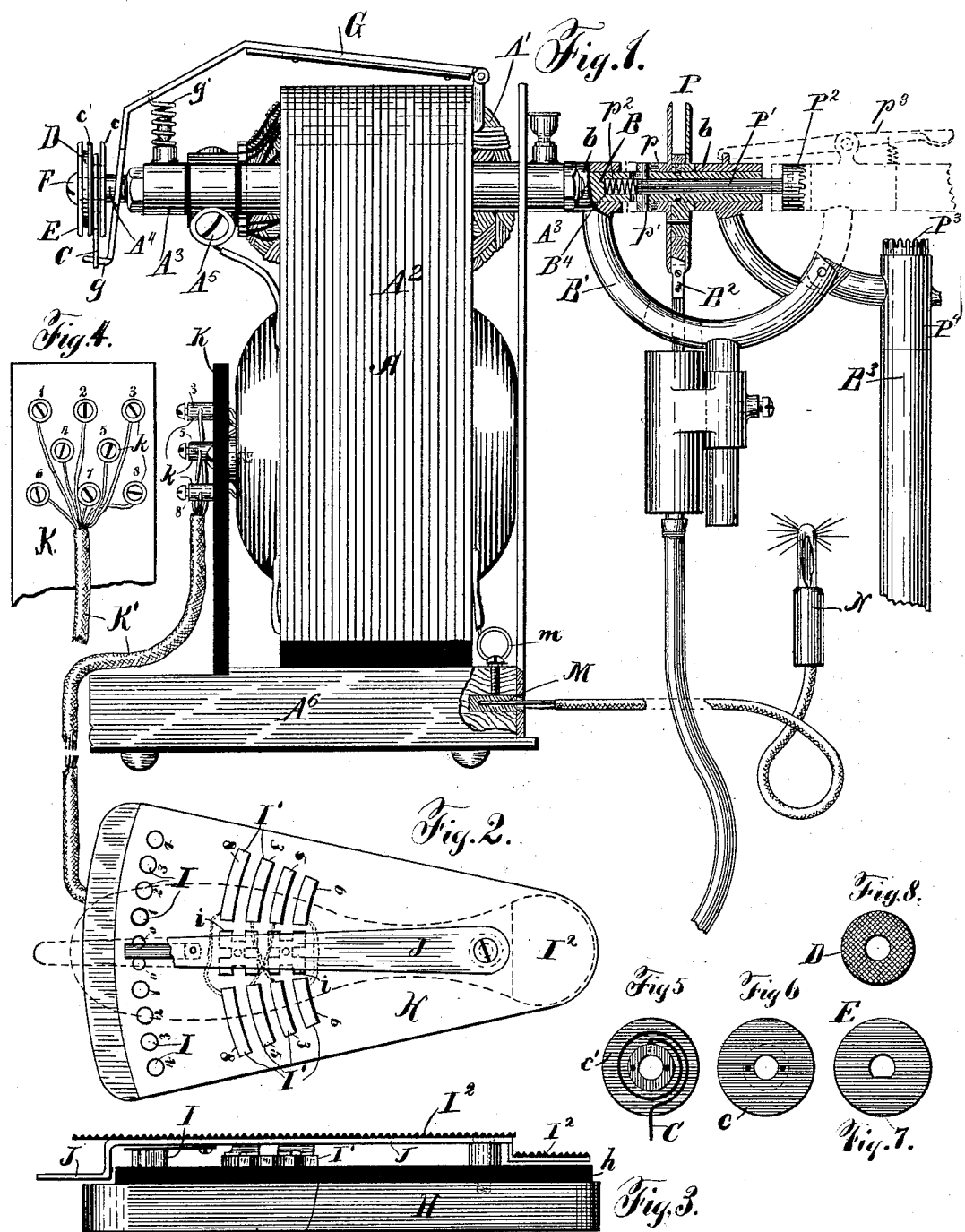
Witnesses.
Thos. D. Sheridan
Samuel E. Hibben
Inventor.
Walter A. Crowdus
By Banning & Banning & Payson
Attorneys.
THE NATIONAL LITHOGRAPHING COMPANY,
WASHINGTON, D. C.

(No Model.)
2 Sheets—Sheet 2.

W. A. CROWDUS.
ELECTRIC MOTOR FOR DENTAL ENGINES.

No. 521,138.
Patented June 5, 1894.

Witnesses.
Thos. F. Sheridan
Samuel E. Hibben

Inventor
Walter A. Crowdus.
By Banning and Banning and Payson.
Attorneys.

UNITED STATES PATENT OFFICE.

WALTER A. CROWDUS, OF CHICAGO, ILLINOIS, ASSIGNOR TO THE TURNEY ELECTRIC MANUFACTURING COMPANY, OF SAME PLACE.

ELECTRIC MOTOR FOR DENTAL ENGINES.

SPECIFICATION forming part of Letters Patent No. 521,138, dated June 5, 1894.

Application filed October 22, 1892. Serial No. 449,578. (No model.)

*To all whom it may concern:*

Be it known that I, WALTER A. CROWDUS, a citizen of the United States, residing at Chicago, Illinois, have invented certain new and useful Improvements in Electric Motors for Dental Engines, of which the following is a specification.

The object of my invention is to provide an electric motor of suitable construction, adapted to drive, engage with and operate a dental engine head, and means by which the same can be quickly stopped from rotation when the current is shut off; and my invention consists in the features and details of construction hereinafter described and claimed.

In the drawings, Figure 1 is a side elevation of my improvement; Fig. 2 a plan view of the floor switch; Fig. 3 a side elevation of the same; Fig. 4 a front elevation of the keyboard; Figs. 5, 6, 7 and 8 details of construction hereinafter described; and Fig. 9 a diagrammatic view of the electric connections and circuits.

In constructing my improvement, I provide a motor, A, having field plates, $A^2$, preferably made of soft iron, of the shape shown in the diagrammatic view in Fig. 9. I secure these field plates together, preferably by means of brackets, $A^3$, through which I run bolts, and securely hold the field plates in place. Mounted in suitable bearings in these brackets is an armature shaft, $A^4$, which has an armature wound around it, known as the Siemens drum armature, and which is adapted to rotate in a suitable opening extending centrally through the field plates. The motor proper is mounted on and insulated from a base, $A^6$, which is provided with an insulated keyboard, K.

In constructing the motor, I provide it with an armature, of the kind known to those skilled in the art as the Siemens drum armature, having its coils connected with the commutator at one end of the armature shaft in the usual manner. The field, $A^2$, of the motor is wound with wire, having a resistance many times greater than that of the armature. The terminals, $A^5$, of the armature—which are the commutator brushes—and the terminals of the field are led to the keyboard, K, particularly shown in the diagrammatic view, Fig. 9. Posts 6 and 8 have wires respectively leading to the two brushes of the armature. Post 3 is connected, by means of the wire 3, with the outside end of the field wire, and post 2, by means of the wire 2, to the inside end of the field wire. These connections, when carried to the foot switch, put the field and armature in what is known as "multiple circuit." It is then understood by those versed in the science to be a shunt wound motor. The other contacts shown on the foot switch serve to regulate the speed and power of the motor, which is accomplished in the following manner: Electrically connected with the outside end of the field is a wire, $a$, having a cross section equal to that of the armature wire. One layer of this wire is wound continuously over the outer layer of the field wire, and is then led through wire 4 to post 4 on the keyboard, as particularly shown in Fig. 9. The same wire as is electrically connected to post 4 is then continuously wound over itself, forming a second layer, $a'$. The end of this section also is then led through wire 1 to post 1 on the keyboard. Continuing then as before, this same wire is wound over the second layer, and forms a third layer, $a^2$, having its outer end electrically connected, by means of the wire 5, to post 5 on the keyboard. It will thus be observed that the keyboard in Figs. 4 and 9 has eight posts, seven of which I have shown connected by wire to the field and armature, and the eighth—known as No. 7—by a branch with a battery to form the electric circuit for a throat lamp.

In practice, a cable containing eight insulated wires is connected through its respective individual wires to one each of the eight posts on the keyboard. The other ends of the wires forming the cable are led and connected to the foot switch, shown particularly in the diagrammatic view, similar wires being connected on the foot switch to the posts and contact strips, numbered correspondingly to the posts of the key board. It will thus be seen that when the foot piece, J, with its contact brushes, is moved to connect post 5 with the foot switch, the electric circuit is closed by the arm J and post 5, also by the contact brushes, $i$ and $i'$, electrically connecting contact strips 6 and 8 with 2 and 3, and the current will flow through the multiple circuit as follows: from the battery through the wire 1, through the foot-piece, J, to post 5, through wire $5^a$ to post 5 on the keyboard, passing through wire 5 to and through the three series coils, $a^2$, $a'$, and $a$, where it divides and flows in parallel through the armature and field, in proportion to their respective resistances.

The current, after dividing, flows through the field circuit as follows: From the series coils it passes through the field coils, back through wire 2 to post 2 on the keyboard, through wire $2^a$ to contact strip $2'$, and through wire $2^b$ to battery. The current flows through the armature circuit, after dividing, as follows: from the three series coils through wire 3 to post 3 on the keyboard, through wire $3^a$ to contact strip $3'$ on the foot-piece—which is electrically connected with strip 3—through contact brush $i$ to contact strip 6, through wire $6^a$ to post 6 on the keyboard, through wire 6 to armature, through the armature, and back by wire 8 to post 8 on the keyboard, through wire $8^a$ to contact strip 8 on the foot switch, through brush $i'$ to contact strip 2 of foot switch, and by return wire $2^b$ to battery.

From the foregoing description it will be seen that since the current from the battery passes through the three large series coils wound around the field, the field is energized to its maximum extent, while the armature—having the resistance of the three series coils interposed between it and the battery—gets a minimum amount of current, the result being a slow speed and proportionately small power to the armature. When the foot-piece J, on the foot switch, is moved farther along until it contacts with post 1, the circuit is closed, and the current flows, as before, through wire 1, foot-piece J to post 1—which is electrically connected with post $1'$—through wire $1^a$ to post 1 of the keyboard, thence through wire 1 to the second series coil $a'$, through two series coils, where it divides and flows in parallel through the armature and field circuit, exactly the same as before described. From this description it will be seen that the third series coil $a^2$, in the circuit, is cut out, and the field energized to a less extent than in the preceding case—where it passed through the three series coils—while the armature obtains a greater amount of current, the result being an increased speed and proportionately increased power to the armature. If the foot-piece, J, be moved farther along, until it contacts post 4 of the foot switch, the circuit is closed, and the current flows from the battery through wire 1, through the foot piece J to post 4, through wire $4^a$ to post 4 of the keyboard, through wire 4 to the first series coil $a$ of the field, through this series coil, where it divides and flows in parallel through the armature and field circuit, exactly as hereinbefore described. It will be seen from this description that two of the large series coils around the field coils have been cut out, and the field energized to a less extent than in the preceding instances, the consequence being a greater flow of current to the armature, with an increased speed and consequent increased power.

By moving the foot-piece J, of the foot switch, to contact post 3, the circuit is closed and the current flows from the battery through wire 1, through the foot piece J to post 3—which is electrically connected with post $3'$—through wire $3^b$ to contact strip $3'$ of the foot switch, where it divides and flows in parallel through the field and armature circuits. It flows through the field circuit as follows: from contact strip $3'$, through wire $3^a$ to post 3 of the keyboard, through wire 3 to the outside field coil, through the field coils, back by wire 2 to post 2 on the keyboard, through wire $2^a$ to contact strip $2'$, and through the return wire $2^b$ to the battery. From the contact strip $3'$, the current flows through the armature circuit as follows: through its connecting wire to contact strip 3, through contact brush $i$ to contact strip 6, through wire $6^a$ to post 6 of the keyboard, through wire 6 to armature, through the armature back through wire 8 to post 8 of the keyboard, from post 8 through wire $8^a$ to contact strip $8'$ of the foot switch, through connecting wire to contact strip 8, through brush $i'$ to contact strip 2, through connecting wire to contact strip $2'$, and through return wire $2^b$ to battery. From this description it will be seen that the three series coils around the field are entirely cut out of circuit, and in this position the field is energized to its least extent, and the armature receives its maximum amount of current and power, which means its greatest speed—its power having been regularly increased as the three coils are successively cut out of circuit.

To reverse the rotation of the armature, the foot piece, J, is moved to the opposite side of the switch board, so as to contact either of the posts $5'$, $1'$, $4'$ or $3'$. The current in all these instances will flow through the field, as hereinbefore described, but in going to the armature—after the current has reached the contact strip $3'$ of the foot switch—it passes through contact brushes, I, to contact strip $8'$, through the wire $8^a$ to post 8 of the keyboard, through wire 8 to the opposite terminal of the armature, as in the previous instance, the result being the reversal of the rotation of the armature. The current flows through the armature, back by wire 6 to post 6 of the keyboard, by wire $6^a$ to contact strip 6 of the foot switch—which is electrically connected with strips $6'$—through contact brush $i'$ to contact strip $2'$, and by return wire to battery.

The dental engine head is secured to the frame of the motor, and in line with the armature shaft, B, which has bearings, $b$, in the same. This head can be of any of the usual forms of construction, but I prefer to make it of the general form shown in the A. J. Harris patents, No. 460,795, of October 6, 1891, and No. 477,411, of June 21, 1892, and use preferably the particular form shown in the drawings and hereinafter described, which is as follows:

I construct a dental engine head, B', in which is mounted in suitable bearings a shaft, B⁴, which is a part of and continuation of the armature shaft in the electric motor. Mounted loosely on this shaft and between the bearings, $b$, $b$, is an eccentric head, P, for operating the plugging mechanism, and having a clutch, $p$, on one side of its hub. The shaft is provided with a cylindrical bore extending axially into the same, in which is fitted loosely the supplementary shaft, P', which rotates with the main shaft, but has an independent longitudinal motion. At one end of this supplementary shaft is a face clutch, P², adapted to engage with a clutch, P³, and operate the drilling mechanism. At the opposite end of the supplementary shaft, and surrounding the main shaft, is a clutch, $p'$, connected to the shaft, P', by means of a dowel pin, so that it partakes of the longitudinal motions of the supplementary shaft. The drilling mechanism is held in the bearings, P⁴, which is hinged to the head and held in place by means of a spring catch, $p^3$, so as to engage with the operating mechanism. When it is desired to disengage it therefrom, the outer end of the spring catch is pressed down, and the head allowed to drop into the position shown in full lines. The small spiral spring, $p^2$, impinges against the end of the supplementary shaft, imparting a longitudinal forward motion to the same, which carries the clutch, $p'$, into engagement with a clutch on the eccentric head, thus operating the plugging mechanism. From this description, it will be seen that the action is entirely automatic. When the drilling mechanism is lifted into the position shown in full lines and adapted to engage with the operating mechanism, it pushes back the supplementary shaft with its clutches, thereby disengaging it from the plugging mechanism, and causing the engagement of the drilling mechanism. At the opposite end of the armature shaft is secured a cushion stop, consisting of a spiral spring, C, one end of which is held firmly in between two metallic washers, $c$, $c'$, which are mounted loosely on the armature shaft. Adjacent to the same is a rubber disk, D, which is held against the washer, C', by means of the disk, E, mounted on the shaft in such manner as to rotate positively with the same. The screw, F, enters a threaded opening in the armature shaft, and is used to regulate the tension between the disk, E, and the cushion stop, in such manner that when extra force is used the stop will be held firmly from rotating, while the armature shaft continues to rotate a trifle longer, so that the momentum is gradually lessened until brought to a complete stop. It will be noticed that the hole in the disk, E, is flattened at one side, in which form I prefer to make it, and the shaft corresponding flattened to fit the same, so that it must rotate with the shaft, but it may be made square, or in any other form desired. Hinged to the field plates is a soft iron plate, G, in such manner that it extends from one side of the field plate to the other. The opposite end of the soft iron plate is bent downward, and has one end, $g$, projecting, so that when it is in the position shown in Fig. 1, it is held upward by means of the spring, $g'$, and the projection, $g$, is in position for the spring, C, on the cushion stop to contact the same, and prevent the armature from rotation. When current is applied and the motor is in circuit, the field becomes charged and electro magnetism is generated. The soft iron plate, G, is thereby attracted downward against the tension of the spring, $g'$, and is held in its downward position as long as the motor is in circuit; and while in that position the projection, $g$, is held down and out of contact with the cushion stop, thereby leaving the armature free to revolve until the current is shut off. The magnetism ceasing, the spring, $g'$, again lifts the plate, G, with its projecting end upward, thereby contacting with the cushion stop and preventing the armature from further rotation.

In Fig. 2 I have shown a floor switch, H, which consists of a base, $h$, preferably made of wood, and mount thereon a piece of fiber or vulcanized rubber, $h'$, to which are secured the keys or switch buttons, I, and contact pieces, I', in such manner that they are perfectly insulated from each other. Pivoted near one end of the floor switch is a foot piece, I², having a metallic strip, J, of brass or other material on the under side, which serves to electrically connect and disconnect the field and armature circuits with each other and the series coils. Attached to the motor is a keyboard, K, preferably made of fiber or vulcanized rubber, having posts or keys, $k$, to which the circuit wires are connected. These posts are numbered 1, 2, 3, 4, 5, 6, 7 and 8, and are electrically connected, through the cable K', with the keys and contact pieces having corresponding numbers on the floor switch. In Figs. 2 and 9, the floor switch is shown in contact with button, O, in such manner that the current is shut off from the source of energy, L, to the motor. When the pedal piece is moved to one side or the other of the zero posts, it will be seen from a glance at the diagrammatic view, (Fig. 9) that the field and armature are thrown into circuit with the battery, and current following rotates the armature. The relation between the contact pieces, I', and the pieces, $i'$, attached to the foot piece, should be such that the field should be thrown into circuit first, so that—electric magnetism being generated—the soft iron plate, G, is drawn downward, and the armature left free to revolve before the armature circuit is completed. Also, when the pedal piece is moved back to the zero mark, the armature circuit is broken first, so that when the field circuit is broken there remains no energy in the armature to rotate the same, thereby lessening the momentum when the spring, C, contacts the projection, G, otherwise there would be danger of injuring the mechanism.

It is understood in the art that a shunt wound dynamo revolves in the same direction as it does when actuated as a motor. The parallel connection between field and armature—unless opened when current is shut off from the motor—serves by the momentum of the armature to keep the field magnetically charged until the armature ceases to rotate. The object of the switch movement, before described, is to prevent this charging of the field, and cause the instantaneous action of the brake.

While I have described the action of the switch as opening the circuit to the armature first, and connecting it last, it may be done simultaneous with the opening or connection of field circuit.

It is often desirable to use what is known as a mouth or throat lamp in dental purposes. In Figs. 1 and 9 I have shown sockets, M, in the base of the motor electrically connected with the source of energy, with a resistance coil, m, to allow the proper volume of current to flow to the lamp, N, the construction and arrangement being such that the end pieces can be easily inserted in the sockets, M, when it is desired to use the lamp, or removed therefrom when it is unnecessary to use the same.

While I have entered into a more or less minute description of the details of my improvement, I do not intend to limit myself unduly thereto, but contemplate all proper and desirable changes in form, proportion and the substitution of equivalent members.

I claim—

1. In electric motors for dental engines, the combination of an electric motor, and a brake located within the magnetic influence of the motor and actuated thereby, substantially as described.

2. In electric motors for dental engines, the combination of an electric motor, a dental engine head attached thereto and in line with the armature shaft and adapted to be driven thereby, and a brake located within the magnetic influence of the motor and actuated by it, substantially as described.

3. In electric motors for dental engines, the combination of an electric motor, a brake attached thereto and actuated by the magnetism of the motor field so that when current is shut off from the motor it instantly stops the revolution of the armature and releases it when the motor is in circuit, substantially as described.

4. In electric motors for dental engines, the combination of an electric motor, a dental engine head attached thereto and in line with the armature shaft, a brake located within the magnetic influence of the field, and a cushion stop attached to the armature shaft and revolving with it and arranged to contact the brake in such manner that the momentum is gradually lessened until brought to a full stop, substantially as described.

5. In electric motors for dental engines, the combination of an electric motor, a dental engine head attached thereto and in line with the armature shaft, a cushion stop secured frictionally to the said shaft consisting of a resilient spring secured to and between two metallic disks, and means for regulating the frictional engagement with said shaft, substantially as described.

6. In combination with a shunt or compound wound electric motor, a switch regulating device consisting of a moving arm adapted to fit the foot, contact brushes attached to and insulated therefrom, one set of contact pieces electrically connected respectively with the inside and outside field wires and arranged on one side of the foot piece, and a second set of contact pieces arranged on the opposite side of the foot piece in such manner that the movement of the foot piece with its contact brushes to contact such pieces electrically connects them so as to give a reverse rotation to the armature, substantially as described.

WALTER A. CROWDUS.

Witnesses:
A. J. HARRIS,
EPHRAIM BANNING.